United States Patent [19]
Kimble

[11] Patent Number: 6,031,531
[45] Date of Patent: Feb. 29, 2000

[54] METHOD AND SYSTEM IN A GRAPHICAL USER INTERFACE FOR FACILITATING CURSOR OBJECT MOVEMENT FOR PHYSICALLY CHALLENGED COMPUTER USERS

[75] Inventor: Christopher John Kimble, Pine Island, Minn.

[73] Assignee: International Business Machines Corporation, Armonk, N.Y.

[21] Appl. No.: 09/056,045

[22] Filed: Apr. 6, 1998

[51] Int. Cl.[7] ........................................ G06F 3/00
[52] U.S. Cl. .................. 345/348; 345/145; 345/157; 345/339; 345/336; 340/825.19
[58] Field of Search .................... 345/339, 145, 345/348, 157, 333, 336, 338; 434/112; 340/825.19

[56] References Cited

U.S. PATENT DOCUMENTS

| | | | |
|---|---|---|---|
| 5,223,828 | 6/1993 | McKiel, Jr. ......................... | 340/825.19 |
| 5,287,102 | 2/1994 | McKiel, Jr. ......................... | 340/825.19 |
| 5,565,888 | 10/1996 | Selker ................................. | 345/146 |
| 5,598,183 | 1/1997 | Robertson et al. ................. | 345/145 |
| 5,646,647 | 7/1997 | Chow .................................. | 345/145 |
| 5,745,100 | 4/1998 | Bates et al. ........................ | 345/157 |
| 5,808,604 | 9/1998 | Robin .................................. | 345/146 |
| 5,896,123 | 4/1999 | Nagahara et al. .................. | 345/145 |

*Primary Examiner*—Raymond J. Bayerl
*Assistant Examiner*—Cuong T. Thai
*Attorney, Agent, or Firm*—Lisa B. Yociss; Andrew J. Dillon

[57] ABSTRACT

A method and system for assisting physically challenged users in positioning cursor objects at desired icons displayed within a graphic interface of a computer system. Icons are displayed within the graphic interface, such that an icon, when graphically selected by a user, facilitates a particular application function. Icon domains are established about each icon, wherein each icon domain is larger than the icon itself. The cursor object may thereafter be automatically positioned at the center of a particular icon, in response to moving the cursor object into an icon domain associated with that particular icon, thereby assisting physically challenged users in efficiently positioning the cursor object at the icon in order to graphically select a particular function associated with the icon. According to this method and system, the icons are thereby graphically magnetized, such that a cursor object is immediately snapped toward a desired icon when entering a graphically magnetized domain surrounding the desired icon, eliminating the need for positioning the cursor object precisely on the icon or other graphical object to be selected.

12 Claims, 7 Drawing Sheets

METHOD AND SYSTEM IN A GRAPHICAL USER INTERFACE FOR FACILITATING CURSOR OBJECT MOVEMENT FOR PHYSICALLY CHALLENGED COMPUTER USERS

BACKGROUND OF THE INVENTION

1. Technical Field

The present invention relates in general to graphical user interface devices and in particular, to graphical user interface elements such as graphically displayed icons. The present invention also relates to pointing devices. More particularly, the present invention relates to technology which assists physically challenged users in efficiently utilizing graphical user interface applications. Still more particularly, the present invention relates to technology which assists physically challenged users in manipulating graphically displayed icons and other objects displayed within graphical user interface devices.

2. Description of the Related Art

A graphical user interface is a type of display format which enables users to choose commands, start programs, and see lists of files, objects and other options by pointing to pictorial representations and lists of menu items on a computer display screen. Choices can generally be activated by either a keyboard or a pointing device such as a mouse. A mouse is a commonly utilized pointing device, containing one or more buttons, that allows a user to interact with a product or operating environment through an associated graphical user interface.

Conventional graphical user interface applications typically provide objects, such as icons, which a user can manipulate to activate particular types of functions. An icon is essentially a graphic symbol, displayed on visual display screen, that a user can point to with a pointing device, such as a mouse, in order to select a particular function or software application associated with the selected icon. An icon usually is a graphical representation of an object, composed of an image, image background and sometimes, a label.

Physically challenged computer users often have a difficult time utilizing pointing devices to manipulate these icons in order to achieve a particular application task associated with the icon or graphically displayed object. For example, for individuals who are unable to accurately utilize their hands, devices exist that translate head motion into cursor movement on a visual display screen. Such assistive technology, however, can be physically taxing to the physically challenged computer user, particularly when positioning a cursor pointer on a particular icon. Often, merely moving the cursor pointer toward a desired icon can by a fatiguing task.

Based on the foregoing, it can be appreciated that a needs exists for a method and system which would allow computer users (i.e., physically-challenged or otherwise) to quickly, easily, and efficiently access graphically displayed icons and other graphical objects. A method and system that could be incorporated into existing computer systems and graphical user interface devices and applications to allow computer users easier access to such graphical objects would be a welcome advance. It is believed that the disclosure provided herein presents such an improved technology.

SUMMARY OF THE INVENTION

It is therefore one object of the present invention to provide for an improved information processing system.

It is therefore another object of the present invention to provide an improved graphical user interface.

It is yet another object of the present invention to provide improved graphical user interface elements, such as graphically displayed icons.

It is still another object of the present invention to provide a method and system for assisting users in efficiently utilizing graphical user interface applications.

It therefore still another object of the present invention to provide an improved method and system for assisting physically challenged users in manipulating graphically displayed icons and other objects displayed within graphical use interface devices.

The above and other objects are achieved as is now described. A method and system for assisting physically challenged users in positioning cursor objects at desired icons displayed within a graphic interface of a computer system. Icons are displayed within the graphic interface, such that an icon, when graphically selected by a user, facilitates a particular application function. Icon domains are established about each icon, wherein each icon domain is larger than the icon itself. The cursor object may thereafter be automatically positioned at the center of a particular icon, in response to moving the cursor object into an icon domain associated with that particular icon, thereby assisting physically challenged users in efficiently positioning the cursor object at the icon in order to graphically select a particular function associated with the icon. According to this method and system, the icons are thereby graphically magnetized, such that a cursor object is immediately snapped toward a desired icon when entering a graphically magnetized domain surrounding the desired icon, eliminating the need for positioning the cursor object precisely on the icon or other graphical object to be selected.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
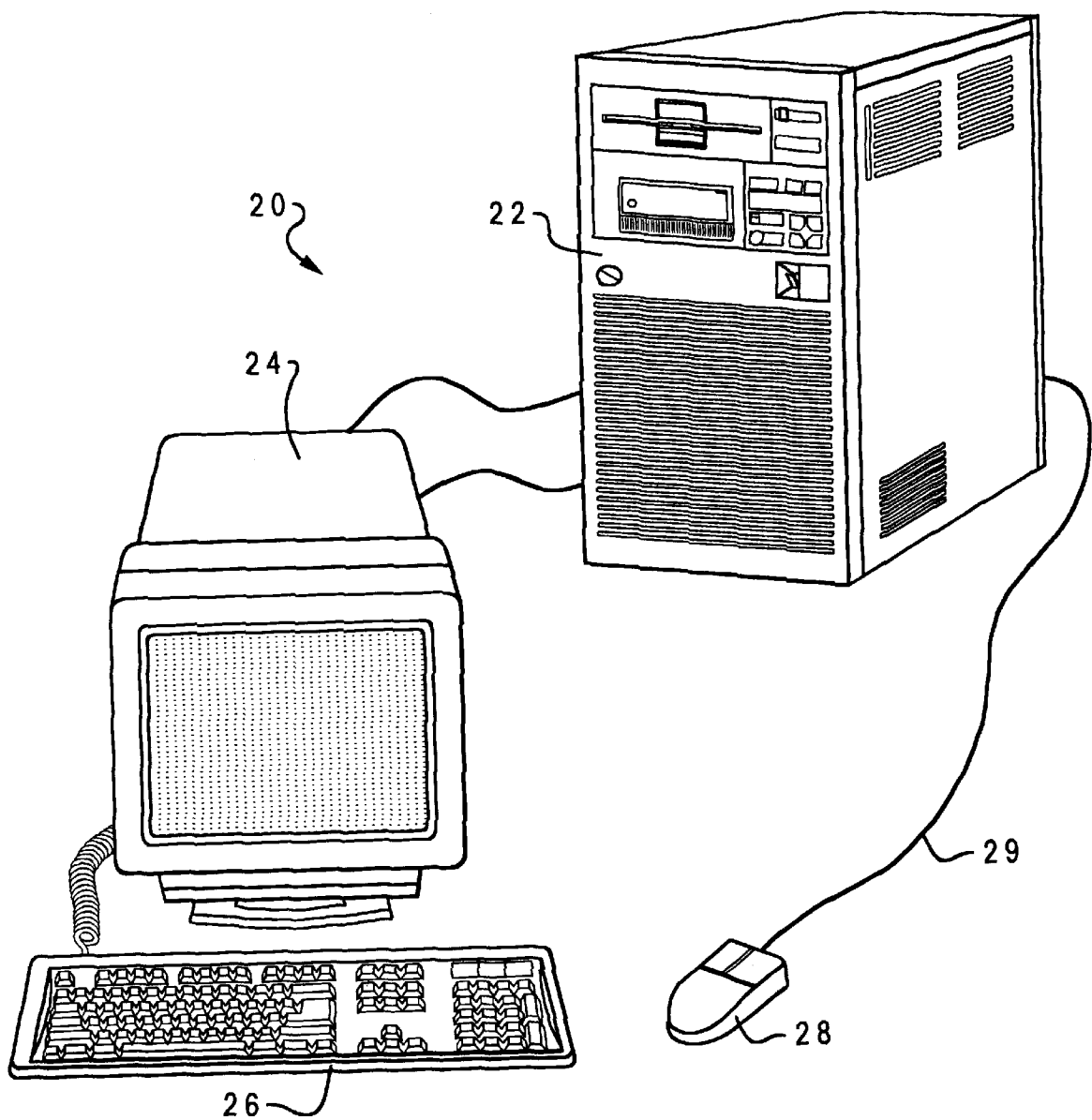
FIG. 1 illustrates a pictorial representation of a computer system which may be utilized to implement a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display terminal 24, a keyboard 26, and a mouse 28. Computer 20 can be implemented utilizing any suitable computer, such as an IBM Aptiva™ computer, a product of International Business Machines Corporation, located in Armonk, N.Y. "Aptiva" is a trademark of International Business Machines Corporation. However, those skilled in the art will appreciate that a preferred embodiment of the present invention can apply to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24.

Figure 2:
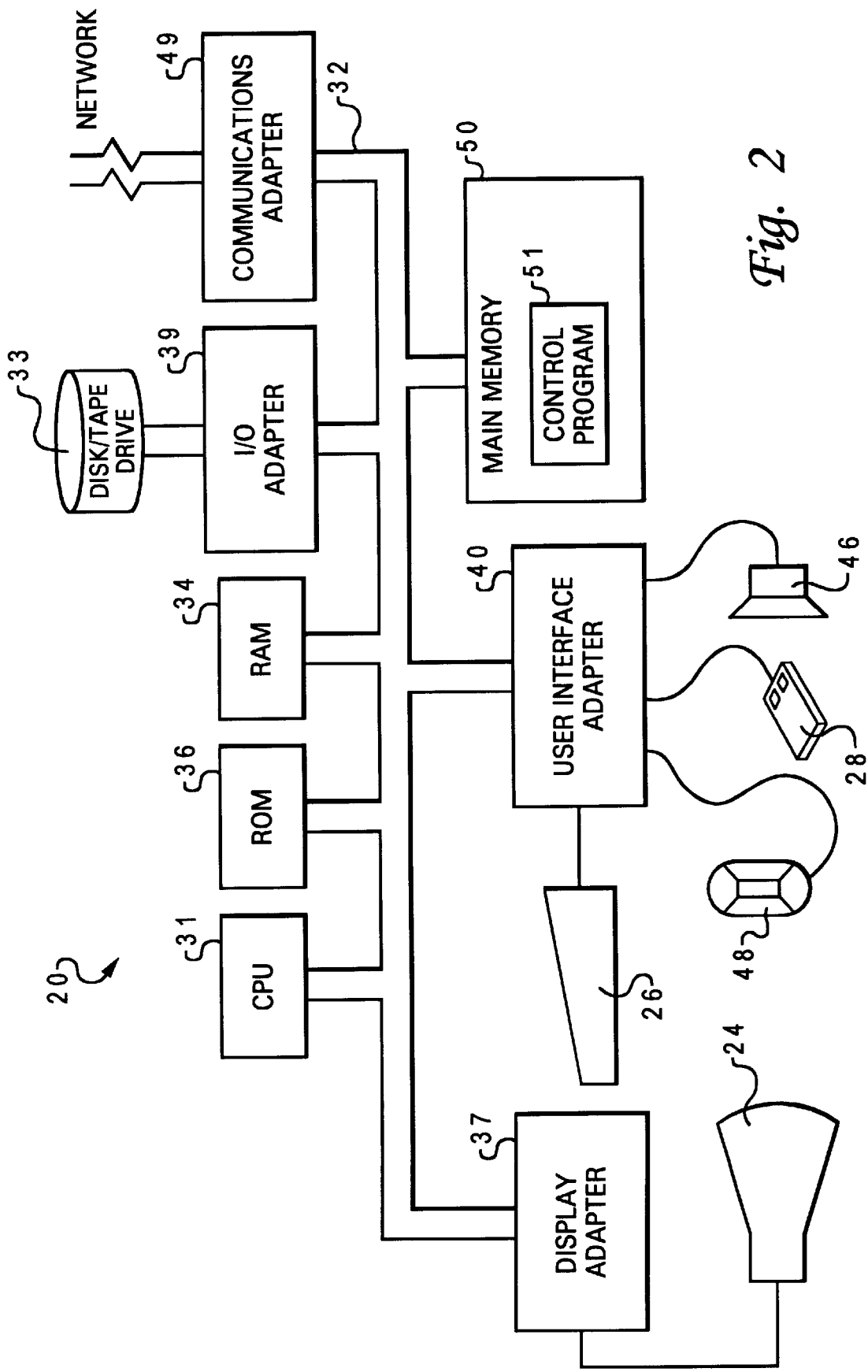
FIG. 2 depicts a representative hardware environment of the computer system illustrated in FIG. 1.

In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 is the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Communications adapter 49 connects computer system 20 to a computer network. Although computer system 20 is shown to contain only a single CPU and a single system 40 bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIXwindows windowing system can direct CPU 31. The AIX operating system is IBM's implementation of the UNIX operating system. UNIX is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, can carry out the logical operations depicted in the logic flowcharts of FIG. 7 and FIG. 8 described herein. The computer program product also can be referred to as a program product.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer system 20 depicted in FIG. 1 and FIG. 2 to transmit information over standard telephone lines.

Figure 3:
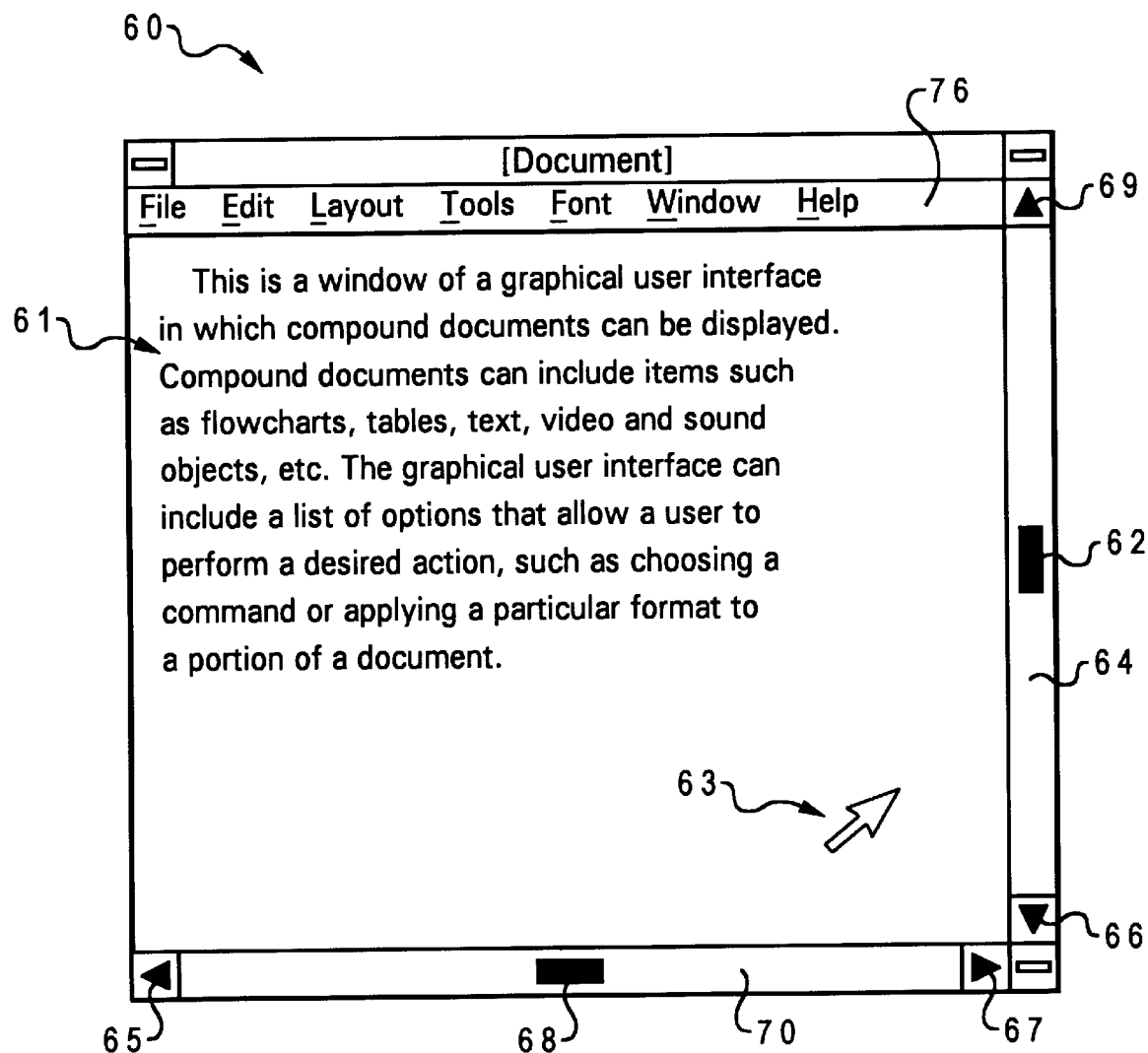
FIG. 3 illustrates a pictorial representation of a graphical user interface window in accordance with a preferred embodiment of the present invention.
Figure 4:
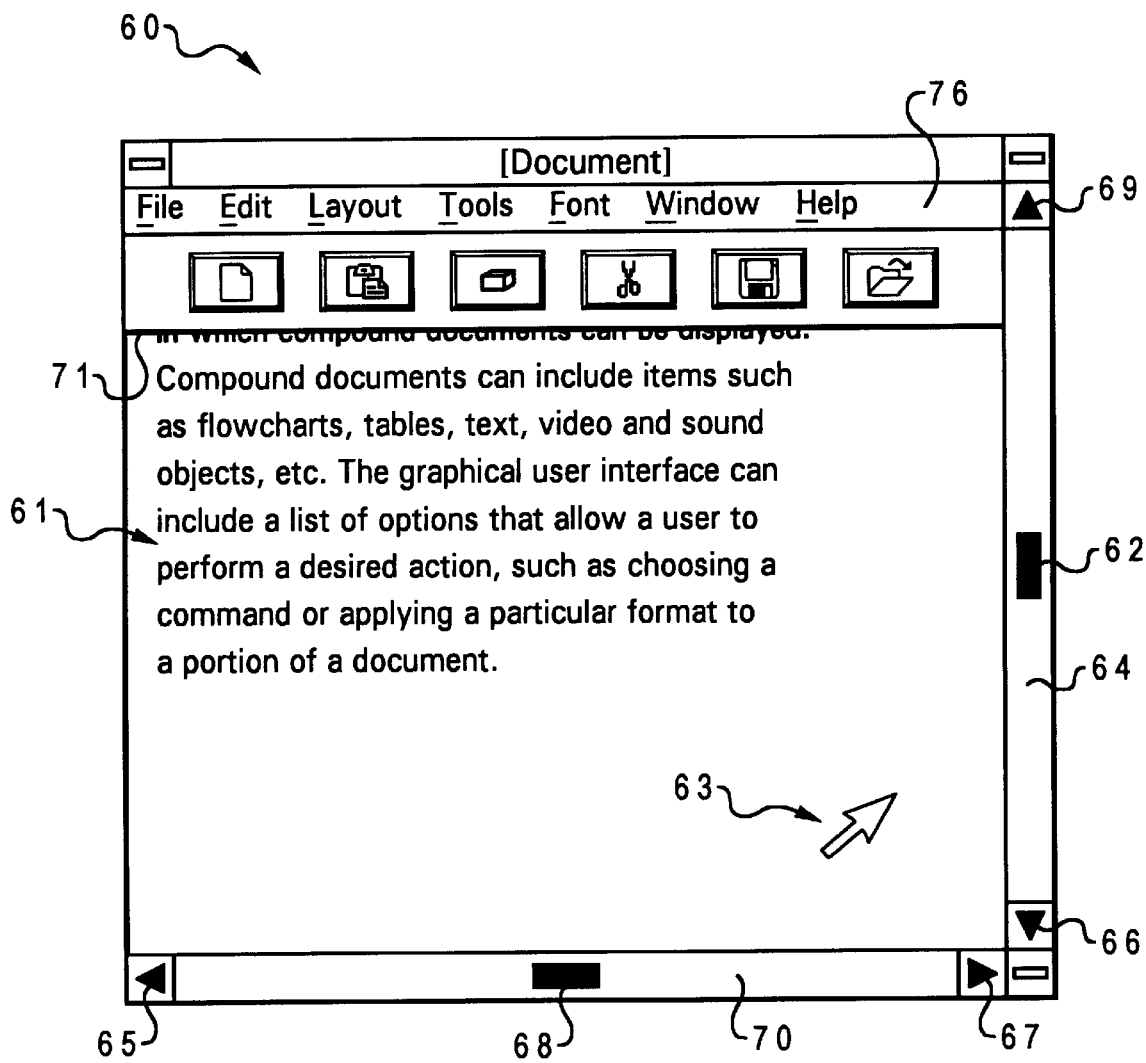
FIG. 4 depicts a pictorial representation of a graphical user interface window and a toolbar displayed within the graphical user interface window, in accordance with a preferred embodiment of the present invention.

FIG. 3 illustrates a pictorial representation of a graphical user interface window 60 in accordance with the method and system of the present invention. In FIG. 3 and FIG. 4, like parts are indicated by identical reference numerals. Window 60 displays a portion of a viewable object, such as a compound document 61. Window 60 is an area on the display screen of a visual display device such as video display 24 of FIG. 1 that is utilized to present a view of an object or to conduct a dialog with a user. The visual display device may also be implemented as an LCD screen, such as those utilized in association "laptop" or "notebook" computers. Regardless of the type of visual display device utilized to display a particular graphical user interface window, such graphical user window "windows" can be utilized to present objects, action options, messages, and so forth.

Compound document 61 is a viewable object that can contain multiple components, such as spreadsheets, text, hotlinks, pictures, sound, and video objects. Examples of objects capable of running within the compound document include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because a compound document can include too large or too many objects to view simultaneously, the user can position a mouse cursor over an arrow section of the window scroll bar and click a pointing device (e.g. a mouse) to scroll the document upward or downward, as appropriate.

The size and position of slider 62 within scroll bar 64 corresponds to the size and position of the current viewable page in relation to compound document 61. The current viewable page is contained within a viewable window area within window 60. Window 60 also includes a menu bar 76. Menu bar 76 is a displayed rectangular bar from which menus can be selected by a user. Those skilled in the art will appreciate that compound document 61 is a document having multiple objects capable of running within the document such as spreadsheets, text, hotlinks, pictures, sounds, and video objects. Other examples of objects capable of running within a compound document such as computer document 61 include graphical representations, spreadsheets, or a collection of text. Names of available menus are displayed within menu bar 76. Choosing a particular menu in response to user input (e.g., mouse or keyboard user input) causes a list of options in the particular menu chosen to be displayed.

Because compound document 61 may include too many pages to view simultaneously, the user can position a cursor object 63 over up-arrow 69 or down-arrow 66 of scroll bar 64 and "click" a button on a pointing device, such as mouse 28 of FIG. 1, to scroll the document upward or downward, as appropriate. Scrolling in this manner permits viewing of any desired portion of compound document 61. Cursor object 63 is an on-screen element whose location changes as the user moves a mouse association with cursor object 63. Depending on the location of cursor object 63 on a display screen, and the operation of the program within which it is working, the area of the screen where cursor object 63 appears serves as the target for an action when the user presses one of the mouse buttons.

Thus, cursor object 63, utilized in association with a mouse, such as mouse 28 of FIG. 1, allows a user to scroll compound document 61 upward or downward. Scrolling is essentially the electronic equivalent of reading through a rolled (i.e., "scrolled") document rather than flipping through pages of a book. Scroll bar 64 is thus a graphical user interface window component, associated with a scrollable area, that indicates to a user that more information is available in a particular direction and can be scrolled into view. Graphical user interface window 60 sizes slider 62 within vertical scroll bar 64 according to the number of pages in compound document 61. Slider 62 is a vertical slider. The length of slider 62 is small with respect to the length of vertical scroll bar 64 because it represents one of many pages of compound document 61.

The graphical user interface which implements window 60, positions slider 62 within vertical scroll bar 64 relative to the viewable position of compound document 61. For example, the graphical user interface positions slider 62 at the top of vertical scroll bar 64 when the user is viewing the first page of compound document 61, and at the bottom of vertical scroll bar 64 when the user is viewing the last page of compound document 61. Slider 62, located on vertical scroll bar 64, is defined to have a minimum size. Window 60 also contains a horizontal scroll bar 70 that may be activated either by mouse clicking on left arrow 65, right arrow 67, or by dragging slider 68 right or left. Slider 68 is analogous to slider 62. However, slider 68 operates in a horizontal direction, while slider 62 operates in a vertical direction. Similarly, vertical scroll bar 64 may be activated either by mouse clicking on up-arrow 69, down-arrow 66, or by dragging the vertical slider 62.

FIG. 4 depicts a pictorial representation of a graphical user interface window 60 and a toolbar 71 displayed within graphical user interface window 60, in accordance with a preferred embodiment of the present invention. Toolbar 71 is a displayed row of on-screen buttons or icons. When an on-screen button or icon maintained in a toolbar is "clicked," utilizing a pointing device such as a mouse, macros or particular functions of the application are activated. The toolbar may be customized by the user and moved about graphical user interface window 60 according to the user's preferences. For example, although toolbar 71 is displayed as a row of icons, toolbar 71 may also be displayed as a column or block of on-screen buttons or icons, depending upon the desires of a particular user.

Figure 5:
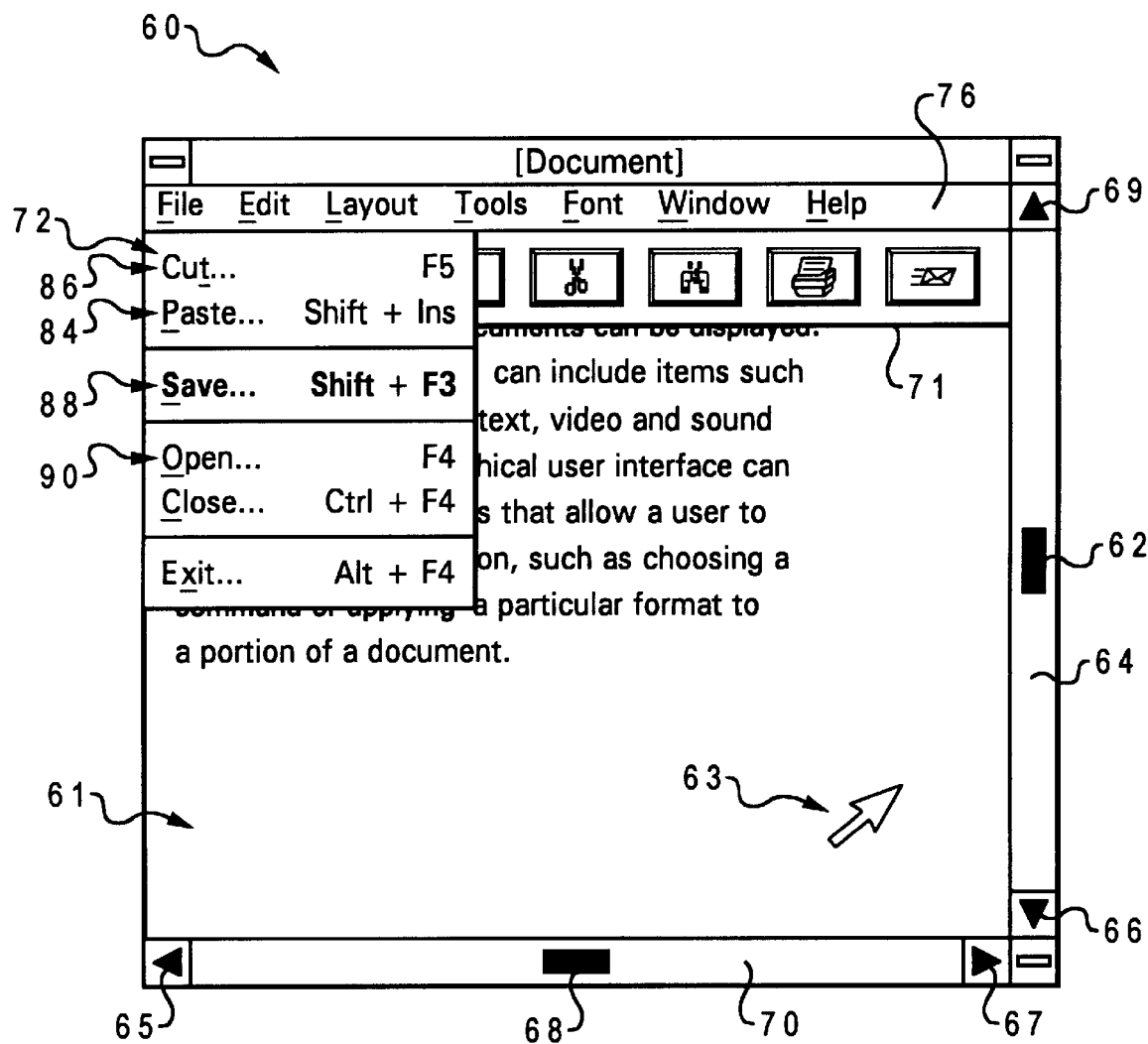
FIG. 5 depicts a pictorial representation of a graphical user interface window, toolbar, and a displayed menu, in accordance with a preferred embodiment of the present invention.

FIG. 5 depicts a pictorial representation of a graphical user interface window 60, toolbar 71, and a displayed menu 72, in accordance with a preferred embodiment of the present invention. The configuration presented in FIG. 5 demonstrates how toolbars and associated icons can interact with graphical menus, such as menu 72. Menu 72 is a list of action, routing, and setting choices. Various types of menus may be implemented in accordance with a preferred embodiment of the present invention. For example, well-known types of menus include cascaded menus and "pop-up" menus. Menu 72 is a pull-down menu. A pull-down menu is a menu of related choices that extends from a selected choice on a menu bar or from a system-menu symbol, such as, for example, system-menu symbol "File," depicted in FIG. 3, FIG. 4, and FIG. 5.

Menu 72 provides predefined mnemonics for each predefined textual choice available within menu 72. For example, the textual choice "Cut" is a predefined mnemonic which initiates a "cutting" or deleting function. Associated with this function is a toolbar accelerator, in this case, toolbar accelerator 86, which is represented by the "F5" key. A toolbar accelerator is essentially a "short cut" which allows a user to activate a particular function directly from the keyboard, in response to a particular keystroke or combination of keystrokes. Other examples of toolbar accelerators within FIG. 5 include toolbar accelerator 84, which represents a "paste" function, toolbar accelerator 88, which represents a "save" function, and toolbar accelerator 90, which represents an "open" function. Toolbar accelerator 90 can be initiated by pressing the "F4" key. Toolbar accelerator 88 can be initiated by pressing the keystroke combination of "shift+F3". Toolbar accelerator 84 is initiated by pressing the keystroke combination of "shift+Ins".

Figure 6A:
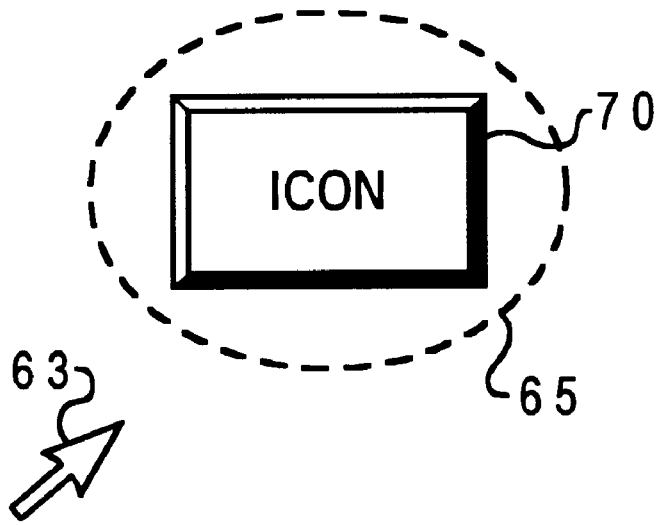
FIG. 6(a) illustrates a pictorial representation of an icon and an associated icon domain, in accordance with a preferred embodiment of the present invention.
Figure 6B:
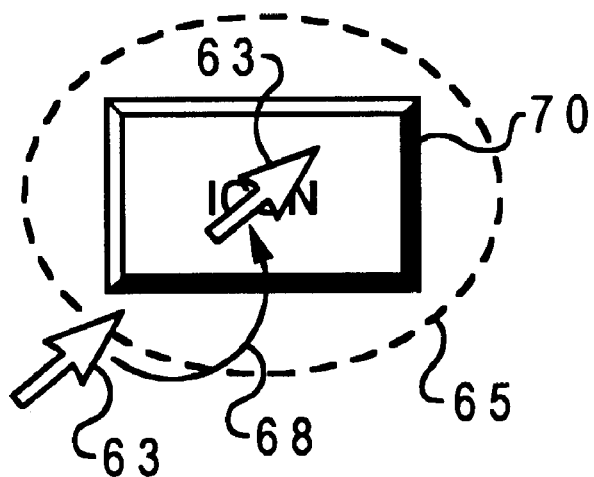
FIG. 6(b) depicts a pictorial representation illustrating the movement of the icon depicted in FIG. 6(a) through the icon domain, in accordance with a preferred embodiment of the present invention.

FIG. 6(*a*) illustrates a pictorial representation of an icon 70 and an associated icon domain 65, in accordance with a preferred embodiment of the present invention. Icon 70 is essentially a "magnetized" graphical object and may be displayed within a window such as window 50 of FIG. 3 and FIG. 4. The term "magnetized" is utilized figuratively herein to refer to a property of icons or objects utilized in association with a preferred embodiment of the present invention. Cursor object 63, depicted in FIG. 6(*a*), is analogous to cursor object 63 of FIG. 3 and FIG. 4. FIG. 6(*b*) depicts a pictorial representation illustrating the movement of cursor object 63 depicted in FIG. 6(*a*) through icon domain 65, in accordance with a preferred embodiment of the present invention. Arrow 68 in FIG. 6(*b*) specifically illustrates the movement of cursor object 63. The icon is "magnetized" such that an area outlined by icon domain 65, with a diameter of perhaps two inches (i.e., depending upon a particular implementation of a preferred embodiment of the present invention), surrounds icon 70. When cursor object 63 is moved into the area outlined by icon domain 65, cursor object 63 is immediately "snapped" to the center of icon 70, which the user may then activate. In response to a particular user input, such as a particular keystroke or combination of keystrokes, the "magnetic" property (i.e., icon domain), may be enabled globally (i.e., for all objects).

Figure 7:
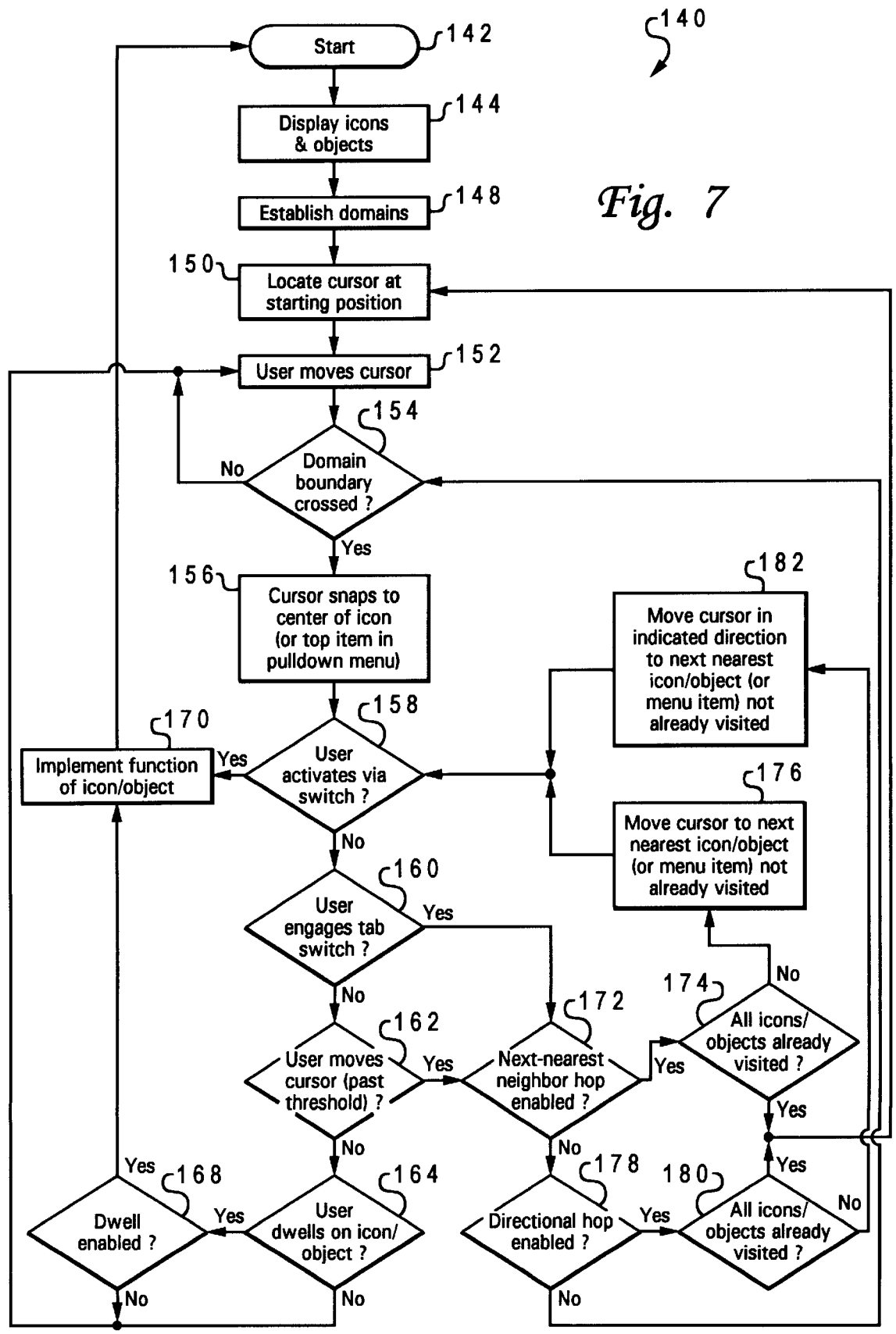
FIG. 7 illustrates a flow diagram that shows general steps utilized to carry out the method and system, according to a preferred embodiment of the present invention.

FIG. 7 is a flow diagram 140 that shows general steps that can be utilized to carry out the method and system, according to a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "initiating" or "retrieving," which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 of FIG. 1 and FIG. 2, in processing electrical or other (e.g. mechanical, chemical) physical signals to generate other desired physical signals.

Thus, as indicated at 142, the process is initiated. As illustrated at block 144, icons and other graphical objects are displayed. The icons constitute small images displayed on a visual display screen, which represents a particular object that may be manipulated by the computer user. As thereafter illustrated at block 148, domains with particular boundaries are established for all displayed icons and graphical objects. As described thereafter at block 150, a starting position for the cursor (i.e., cursor object) is established. This starting position may be located at the center of the screen to minimize user effort. If an icon or object occupies the center of the screen, the starting position may be moved just outside the domain of the icon/object, or the starting position may remain within the icon/object domain with the "dwell" feature described herein temporarily disabled so that the icon/object is not activated against the user's wishes. Alternatively, the starting position may be located at the icon/object that was first activated the last time the particular screen (i.e., application page) was utilized. In this case, the "dwell" feature may also be temporarily disabled.

When the user moves the cursor, as indicated at block 152, a test is performed, as illustrated at block 154, to determine whether a domain has been crossed. If it is determined that a domain has not been crossed by the cursor, then the operation described at block 152 is repeated. However, if it is determined that the boundary has been crossed, then the operation depicted at block 156 is processed. As indicated at block 156, when the cursor crosses the domain boundary, the cursor is "snapped" to the center of the icon (i.e., or snapped to the top item in a pull-down menu, such as menu 72 of FIG. 5). Thereafter, by triggering a switch, as indicated at block 158, the user can implement the function of the icon/object, as illustrated at block 170. This switch would probably not be appropriate for placement on a mouse, nor actually be composed of an existing mouse button. For a quadriplegic user, for example, the switch may comprise a sip-and-puff switch, well known in the assistive technological arts. Other switches are, of course, possible. For example, the switch may be based on a sound sensitive switch, an eye motion switch, electrical signals, and so forth. For users who are not paralyzed, but have impaired control of extremity movements, other switching technologies are possible.

By triggering a tab switch, as illustrated at block 160, the user causes the cursor to "hop" to another icon/object, as indicated at block 172, wherein a "next-nearest neighbor" hop is enabled. If the "next-nearest neighbor hop" feature is enabled, as indicated at block 172, thereby requiring that the "directional hop" feature be disabled, then as indicated at block 174, a test is performed to determine whether all of the icons/objects have already been visited. If it is determined that all of the icons/objects have already been visited, then as indicated at block 150, the cursor returns to the starting position, in which case the list of icons/objects already visited is cleared. If, however, it is determined, as illustrated at block 174, that all of the icons/objects have not already been visited, then as indicated at block 176, the cursor is moved to the next nearest icon/object (i.e., or menu item) not already visited. Following completion of the operation depicted at block 176, the process beginning, as described at block 158, is repeated.

If the "directional hop" feature is enabled, as described at block 178, thereby requiring that the "next-nearest neighbor hop" feature be disabled, then as indicated at block 180, a test is performed to determine if all the icons/objects have already been visited. If it is determined that all of the icons/objects have already been visited, then as indicated at block 150, the cursor returns to the starting position, and the list of icons/objects already visited will be cleared. If, however, it is determined that all of the icons/objects have not already been visited, then as depicted at block 182, the cursor "hops" to the nearest icon/object located in the direction of the cursor movement (i.e., which has not already been visited since the cursor was last located at the starting position of the present screen), although other icons/objects may in fact be positioned closer.

If, after processing of the operation described at block 160, it is determined that the tab switch is not engaged, then a test is performed, as illustrated at block 162, to determine if the user has moved the cursor past a particular threshold. If so, then the operations beginning, as indicated at block 172, are repeated. Essentially, the user can cause the cursor to hop to another icon/object. The amount of cursor movement necessary to trigger the hop can be adjustable by the user when configuring this particular feature (i.e., configuring a particular threshold). If it is determined that the cursor has not moved past the configured threshold, then as indicated at block 164, an additional test is performed to determine whether the cursor is "dwelling" on an icon/object. If it is determined that the cursor is "dwelling" on the icon/object, then the "dwell" feature is enabled, as indicated at block 168.

By "dwelling on the icon/object (i.e., by not utilizing a switch or moving the cursor), the function associated with the icon/object upon which the cursor is "dwelling" is automatically activated. The dwell time threshold may be adjusted by the user when configuring this particular feature. Assuming that the dwell feature is enabled, then the operations described, beginning at block 170, are repeated. It is important to note that special consideration is given to pull-down menus, such as menu 72 depicted in FIG. 5. When the user moves the cursor to a pull-down menu heading, the cursor automatically hops to the top item in the list that drops down from the heading. Thereafter, the operations described in FIG. 7 apply.

Several configuration options may be set prior to an application session which utilizes the method and system described herein. Such configuration options may include user alterable preferences. For example, in response to a particular user input, all of the icon domains may be enabled. The "directional hop" feature versus the "next-nearest neighbor hop" feature described herein may be enabled or disabled, in response to a particular user input. The same is also true of the "dwell" feature, which may be enabled or disabled in response to a particular user input. The size of the domains may also be altered, based on user preferences. The dimensions of the domains (i.e., circular, rectangular, vertically oriented for pull-down menu headings, etc.) may also be altered, based on user preferences. In addition, the dwell "threshold" mentioned herein for activating an icon-object may also be altered, in response to a particular user input. Motion thresholds (i.e., distance moved during a time interval) for triggering a hop can also be set prior to or during a particular application session. In addition, directional sensitivity (i.e., for a directional hop) may also be set prior to or during a particular application session.

In an alternative preferred embodiment of the present invention, an optional enhancement for resolving conflicting or overlapping icon domains is to implement directional sensitivity. If the first icon is not the desired icon, the user then moves the cursor object in the direction of the correct object or icon. The cursor object immediately "snaps" to the object or icon in that direction, even though that object or icon might not in fact constitute the nearest icon.

In another alternative preferred embodiment of the present invention, the concept of "demagnetizing" an icon/object may be implemented. Typically, the icons located within a graphical user interface environment are not isolated from one another. Multiple icons and other graphical objects are typically displayed in close proximity to one another, such as the icons depicted within toolbar 71 of FIG. 4. The "magnetic" or icon domains thus overlap one another. Such overlapping does not pose a problem, because an object such as an icon loses its "magnetism" if the user moves the cursor object, after the cursor object has been "snapped" to the desired graphically displayed object or icon. The cursor object then "snaps" (i.e., automatically moves) to the nearest neighboring icon or object. A "demagnetized" object remains "demagnetized" for a specified time interval (e.g., two seconds), in order to provide the computer user with an opportunity to find the desired object or icon, if neither the first nor second icon (etc.), is the correct one sought. Of course, those skilled in the art will appreciate that this concept of "demagnetizing" icons/objects is merely one potential alternative preferred embodiment of the present invention.

In still another alternative preferred embodiment of the present invention, the cursor object can be configured to "snap" to the nearest neighboring icon if the user does not move the cursor object away from the current icon after a specified time interval. Those skilled in the art will appreciate, however, that this particular method is only suitable if the user controls icon activation via a switch. Such an alternative preferred embodiment of the present invention would not be desirable with so-called "dwell" methods, wherein an icon or other object is activated when the cursor object has "dwelled" upon it for a specified time interval.

Based on the foregoing, those skilled in the art will appreciate that the method and system described herein applies to a variety of graphically displayed objects, such as pull-down menus, scroll bars, and so forth, and not merely graphically displayed icons. In addition, those skilled in the art will also appreciate that the pointing devices utilized in association with a preferred embodiment of the present invention may also include user-adjustable speed and acceleration settings, in order to allow individuals with impaired motor control to minimize jerkiness when moving the cursor.

The embodiments and examples set forth herein are presented in order to best explain the present invention and its practical application and, thereby, to enable those skilled in the art to make and use the invention. Those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method in a computer system for assisting physically challenged users in positioning cursor objects at desired icons displayed within a graphic interface of said computer system, said method comprising the steps of:

displaying an icon within said graphic interface, wherein said icon, when graphically selected by a user, facilitates a particular application function;

establishing an icon domain about said icon, said icon domain being larger than said icon;

automatically positioning said cursor object at the center of said icon, in response to moving said cursor object into said icon domain, thereby assisting physically challenged users in efficiently positioning said cursor object at said icon in order to graphically select a particular function associated with said icon;

compiling a registry of icons previously visited by said cursor object during a current application session;

determining if said icon is contained within said registry; and automatically repositioning said cursor object from said icon to the center of said another icon located nearest said icon, if said icon is not contained within said registry.

2. The method of claim 1 further comprising the step of:

automatically activating a function associated with said icon, when said cursor object remains located at the center of said icon after a particular time period.

3. The method of claim 1 further comprising the steps of:

detecting another icon located nearest said icon; and automatically repositioning said cursor object from said icon to the center of said another icon located nearest said icon, after a specified time interval.

4. The method of claim 1 further comprising the step of cancelling all icon domains, in response to a particular user input.

5. The method of claim 4 further comprising the step of establishing icon domains about each icon, in response to a particular user input.

6. The method of claim 1 further comprising the step of:

automatically positioning said cursor object at the center of another icon located in the immediate direction in which said cursor object moves away from said icon, in response to moving said cursor object away from said icon.

7. A system for assisting physically challenged users in positioning cursor objects at desired icons displayed within a graphic interface of a computer system, said system comprising:

means for displaying an icon within said graphic interface, wherein said icon, when graphically selected by a user, facilitates a particular application function;

means for establishing an icon domain about said icon, said icon domain being larger than said icon; and means for automatically positioning said cursor object at the center of said icon, in response to moving said cursor object into said icon domain, thereby assisting physically challenged users in efficiently positioning said cursor object at said icon in order to graphically select a particular function associated with said icon;

means for compiling a registry of icons previously visited by said cursor object during a current application session;

means for determining if said icon is contained within said registry; and means for automatically repositioning said cursor object from said icon to the center of said another icon located nearest said icon, if said icon is not contained within said registry.

8. The system of claim 7 further comprising:

means for automatically activating a function associated with said icon, when said cursor object remains located at the center of said icon after a particular time period.

9. The system of claim 7 further comprising:

means for detecting another icon located nearest said icon; and means for automatically repositioning said cursor object from said icon to the center of said another icon located nearest said icon, after a specified time interval.

10. The system of claim 7 further comprising means for cancelling all icon domains, in response to a particular user input.

11. The system of claim 10 further comprising means for establishing icon domains about each icon, in response to a particular user input.

12. The system of claim 7 further comprising means for automatically positioning said cursor object at the center of another icon located in the immediate direction in which said cursor object moves away from said icon, in response to moving said cursor object away from said icon.

* * * * *